(12) United States Patent
Kohara et al.

(10) Patent No.: US 12,554,294 B2
(45) Date of Patent: Feb. 17, 2026

(54) ELECTRONIC DEVICE

(71) Applicant: Panasonic Intellectual Property Management Co., Ltd., Osaka (JP)

(72) Inventors: Junpei Kohara, Osaka (JP); Takamitsu Suzuki, Osaka (JP); Shintarou Tanaka, Osaka (JP); Junichi Hasegawa, Osaka (JP); Hiroki Kamezaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 213 days.

(21) Appl. No.: 18/375,527

(22) Filed: Oct. 1, 2023

(65) Prior Publication Data

US 2024/0028089 A1 Jan. 25, 2024

Related U.S. Application Data

(63) Continuation of application No. PCT/JP2022/014375, filed on Mar. 25, 2022.

(30) Foreign Application Priority Data

Apr. 15, 2021 (JP) .................................. 2021-069182

(51) Int. Cl.
*G06F 1/16* (2006.01)
(52) U.S. Cl.
CPC .................................. *G06F 1/1688* (2013.01)
(58) Field of Classification Search
CPC .................................................... G06F 1/1688
See application file for complete search history.

(56) References Cited

U.S. PATENT DOCUMENTS

| | | | | |
|---|---|---|---|---|
| 5,825,614 A | * | 10/1998 | Kim | G06F 1/1669 361/679.55 |
| 6,040,978 A | * | 3/2000 | Spencer | G06F 1/1616 361/679.06 |
| 6,078,497 A | * | 6/2000 | Derocher | G06F 1/1616 345/905 |

(Continued)

FOREIGN PATENT DOCUMENTS

| | | |
|---|---|---|
| JP | 2001-307799 A | 11/2001 |
| JP | 2002-368853 A | 12/2002 |

(Continued)

OTHER PUBLICATIONS

International Search Report for related Application No. PCT/JP2022/014375, mailed May 31, 2022.

*Primary Examiner* — Nidhi Thaker
(74) *Attorney, Agent, or Firm* — Renner, Otto, Boisselle & Sklar, LLP

(57) ABSTRACT

An electronic device of the present disclosure includes: a first housing that includes a first outer surface including a keyboard and includes a second outer surface opposite to the first outer surface; a second housing that houses a display and is connected to the first housing; and a speaker unit disposed inside the first housing. The second outer surface includes a recess. A recess includes a through hole in at least a part of a surface of the recess. At least a part of the speaker unit faces at least a part of a back surface of the surface of the recess including the through hole.

11 Claims, 12 Drawing Sheets

(56) References Cited

U.S. PATENT DOCUMENTS

| | | | | |
|---|---|---|---|---|
| 6,243,260 B1* | 6/2001 | Lundgren | ............ | G06F 1/1688 |
| | | | | 381/87 |
| 6,415,035 B1* | 7/2002 | Shin | ............ | G06F 1/1632 |
| | | | | 381/388 |
| 6,525,927 B1* | 2/2003 | Sugai | ............ | G06F 1/1688 |
| | | | | 361/679.56 |
| 6,600,827 B2* | 7/2003 | Lu | ............ | H04R 5/02 |
| | | | | 248/316.4 |
| 6,794,798 B2* | 9/2004 | Watanabe | ............ | H04R 5/02 |
| | | | | 310/334 |
| 7,072,484 B2* | 7/2006 | Shin | ............ | G06F 1/1688 |
| | | | | 381/388 |
| 7,200,000 B1* | 4/2007 | Huang | ............ | G06F 1/1616 |
| | | | | 361/679.55 |
| 7,453,440 B2* | 11/2008 | Sun | ............ | G06F 1/166 |
| | | | | 345/169 |
| 8,369,561 B2* | 2/2013 | Bhutani | ............ | H04R 5/02 |
| | | | | 381/387 |
| 2002/0048975 A1 | 4/2002 | Horikoshi et al. | | |
| 2003/0186728 A1 | 10/2003 | Manjo | | |
| 2008/0062633 A1* | 3/2008 | Yamaguchi | ............ | G06F 1/1688 |
| | | | | 361/679.55 |

FOREIGN PATENT DOCUMENTS

| | | |
|---|---|---|
| JP | 2010-154357 A | 7/2010 |
| JP | 2012-227854 A | 11/2012 |
| JP | 2018-121175 A | 8/2018 |

\* cited by examiner

ELECTRONIC DEVICE

BACKGROUND

1. Technical Field

The present disclosure relates to an electronic device including a speaker unit.

2. Description of the Related Art

Patent Literature (PTL) 1 discloses an electronic device including a protrusion formed to protrude outward from a bottom surface of a housing. The electronic device disclosed in PTL 1 includes a speaker unit provided in the protrusion, and an opening formed on the inclined surface of the protrusion for transmitting sound emitted by the speaker unit to the outside.

PTL 1 is Unexamined Japanese Patent Publication No. 2012-227854.

SUMMARY

An object of the present disclosure is to provide an electronic device capable of suppressing a decrease in sound pressure of a sound emitted by a speaker unit.

An electronic device according to one aspect of the present disclosure includes:
- a first housing that includes a first outer surface including a keyboard and includes a second outer surface opposite to the first outer surface;
- a second housing that houses a display and is connected to the first housing; and
- a speaker unit disposed inside the first housing,
- wherein
- the second outer surface includes a recess,
- the recess includes a through hole in at least a part of a surface of the recess, and
- at least a part of the speaker unit faces at least a part of a back surface of the surface of the recess including the through hole.

According to the present disclosure, it is possible to provide an electronic device capable of suppressing a decrease in sound pressure of a sound emitted by a speaker unit.

DETAILED DESCRIPTION

Background to Present Disclosure

Figure 1:
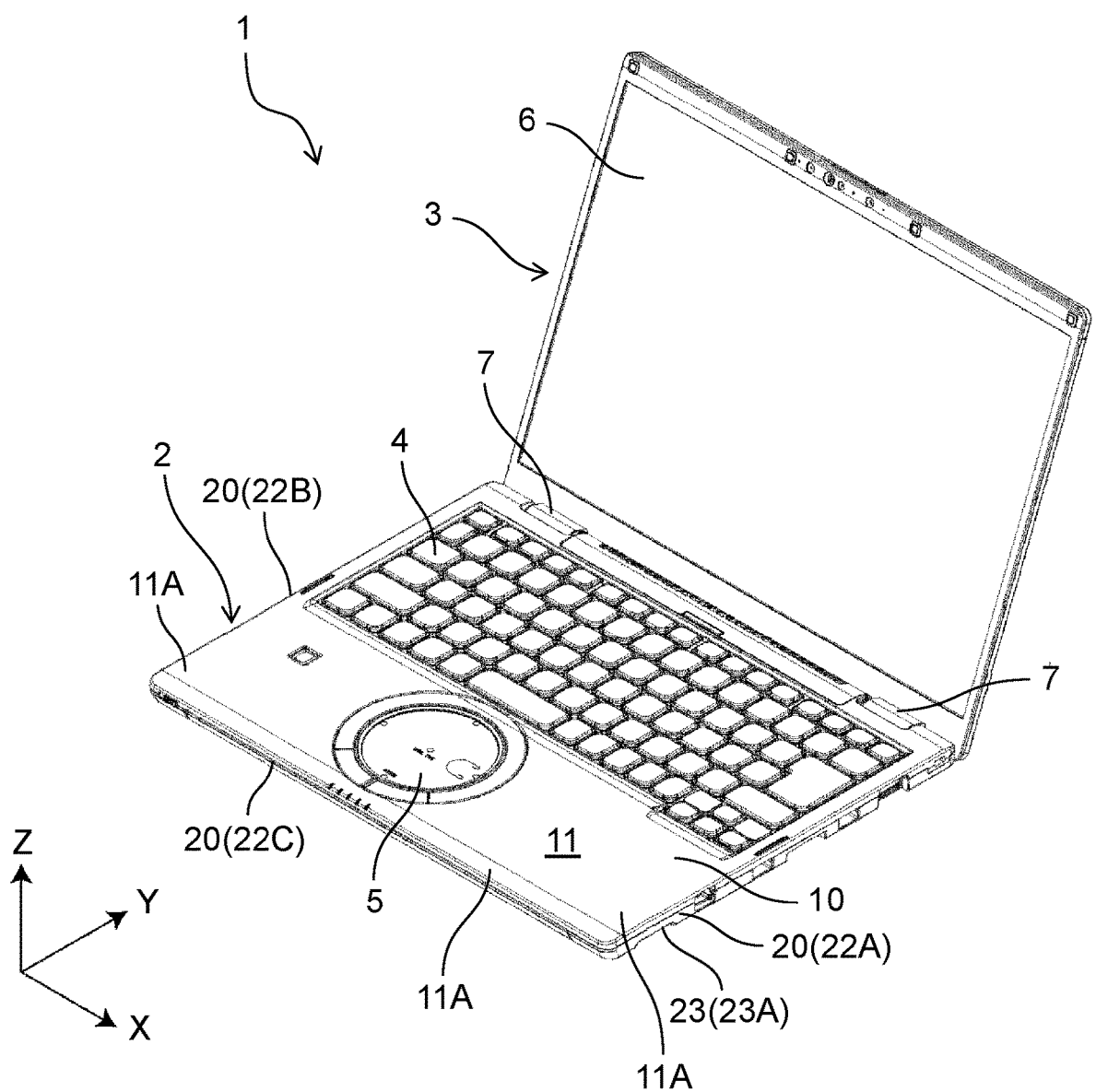
FIG. 1 is a perspective view of one example of an electronic device according to a first exemplary embodiment of the present disclosure.

Examples of the electronic device include a notebook computer (laptop PC). The notebook computer includes a first housing that houses a keyboard and a second housing that houses a display. The first housing and the second housing are rotatably connected via a hinge. In such a computer, the speaker unit is built in the first housing, and a through hole for transmitting sound emitted by the speaker unit to the outside of the computer is formed in the first housing.

In recent years, remote work has become widespread. Remote work refers to the performance of work by employees in locations other than their offices. With the spread of remote work, there are increasing opportunities for meetings to be held by a number of people, each in a different location. In this case, it is required to improve the sound pressure of the sound emitted from the computer of each person.

However, the arrangement position of the speaker unit and the formation position of the through hole are limited as follows.

For example, when the through hole is formed in the surface of the first housing in which the keyboard is disposed, the through hole is formed on the hinge side of the surface of the first housing. This is because when the through hole is formed on the side opposite to the hinge on the surface of the first housing, there is a risk that a hand or an arm of the user operating the keyboard blocks the through hole.

In addition, for example, with the recent spread of fifth generation mobile communication systems and the like, it is required to mount an antenna compatible with high-speed communication on a computer. When this antenna is mounted on the hinge side of the surface of the first housing, the arrangement position of the speaker unit and the formation position of the through hole are limited.

Therefore, it is conceivable to form a through hole in the back surface of the first housing. However, when the computer is placed on the user's knee or the like, the through hole is blocked, and sound pressure of sound emitted from the speaker unit decreases.

Therefore, the present inventors have found that a recess is formed on the back surface of the first housing, and a through hole for transmitting sound emitted from the speaker unit to the outside is formed in the recess, leading to the following invention.

An electronic device according to a first aspect of the present disclosure includes:
- a first housing that includes a first outer surface including a keyboard and includes a second outer surface opposite to the first outer surface;

a second housing that houses a display and is connected to the first housing; and a speaker unit disposed inside the first housing, wherein the second outer surface includes a recess, the recess includes a through hole in at least a part of a surface of the recess, and at least a part of the speaker unit faces at least a part of a back surface of the surface of the recess including the through hole.

This configuration reduces the possibility of the through hole being blocked by the knee or the like of the user. Therefore, a decrease in sound pressure of sound emitted by the speaker unit can be suppressed.

In an electronic device according to a second aspect of the present disclosure, the first housing may include a third outer surface located between a peripheral edge of the first outer surface and a peripheral edge of the second outer surface, and the recess may be open to the third outer surface.

This configuration allows the recess to be open on the third outer surface in addition to the second outer surface. This allows the sound emitted by the speaker unit to be transmitted to the outside of the electronic device through the opening in the third outer surface.

In an electronic device according to a third aspect of the present disclosure, the recess may include a bottom surface continuous with the third outer surface, and the bottom surface may be inclined toward the third outer surface in a direction approaching the first outer surface.

This configuration causes the distance between the bottom surface of the recess and the second outer surface to become wider in the direction toward the third outer surface. Consequently, sound of the speaker unit transmitted to the outside of the electronic device through the opening in the third outer surface can be spread in the recess. Therefore, sound pressure and sound quality of the sound emitted by the speaker unit can be improved.

In an electronic device according to a fourth aspect of the present disclosure, the bottom surface may have an inclination angle of 1° or more and 45° or less with respect to the second outer surface.

When the electronic device is used on a desk, on a knee, or the like, sound emitted from the speaker unit toward the desk, the knee, or the like are reflected by the desk, the knee, or the like. In a case where the inclination angle is 0°, most of the sound reflected by the desk, the knee, and the like hits the bottom surface. As a result, the sound becomes muffled between the desk, the knee, and the like and the bottom surface, and may be difficult to reach the user's ear. On the other hand, in a case where the inclination angle is larger than 45°, the sound easily escapes in the horizontal direction, and the sound pressure may decrease. In contrast, in this configuration, it is possible to reduce the sound that hits the bottom surface by setting the inclination angle to 1° or more. In addition, in this configuration, the inclination angle is set to 45° or less, so that it is possible to suppress a decrease in sound pressure by using reverberation of sound between the desk, the knee, and the like and the bottom surface.

In an electronic device according to a fifth aspect of the present disclosure, the recess may include a pair of side surfaces facing each other and each continuous with the third outer surface, and at least one of the pair of side surfaces may be inclined in a direction where a distance between the pair of side surfaces increases toward the third outer surface.

This configuration causes the distance between the pair of side surfaces to become wider in the direction toward the third outer surface. Consequently, sound of the speaker unit transmitted to the outside of the electronic device through the opening in the third outer surface can be spread in the recess. Therefore, sound pressure and sound quality of the sound emitted by the speaker unit can be improved.

In an electronic device according to a sixth aspect of the present disclosure, the recess may include a pair of side surfaces facing each other and each continuous with the second outer surface, and at least one of the pair of side surfaces may be inclined in a direction where a distance between the pair of side surfaces increases toward the second outer surface.

This configuration causes the distance between the pair of side surfaces to become wider in the direction toward the second outer surface. Consequently, sound of the speaker unit transmitted to the outside of the electronic device through the opening in the second outer surface can be spread in the recess. Therefore, sound pressure and sound quality of the sound emitted by the speaker unit can be improved.

In an electronic device according to a seventh aspect of the present disclosure, the recess may include a pair of side surfaces facing each other and each continuous with the second outer surface and the third outer surface, and the pair of side surfaces may be inclined in a direction where a distance between the pair of side surfaces increases toward the second outer surface and in a direction where a distance between the pair of side surfaces increases toward the third outer surface.

This configuration causes the distance between the pair of side surfaces to become wider in the direction toward the second outer surface and in the direction toward the third outer surface. Consequently, sound of the speaker unit transmitted to the outside of the electronic device through the opening in the second outer surface and the opening in the third outer surface can be spread in the recess. Therefore, sound pressure and sound quality of the sound emitted by the speaker unit can be improved.

In an electronic device according to an eighth aspect of the present disclosure, an inclination angle of each of the pair of side surfaces inclined in the direction where a distance between the pair of side surfaces increases toward the third outer surface may be 5° or more and 45° or less with respect to a virtual plane orthogonal to the second outer surface and the third outer surface.

In this configuration, the inclination angle is set to 5° or more to increase the sound spread. In this configuration, the inclination angle is set to 45° or less. This allows suppression of a decrease in sound pressure by using reverberation of sound between the pair of side surfaces.

In an electronic device according to a ninth aspect of the present disclosure, an inclination angle of each of the pair of side surfaces inclined in the direction where a distance between the pair of side surfaces increases toward the second outer surface may be 5° or more and 45° or less with respect to a virtual plane orthogonal to the second outer surface and the third outer surface.

In this configuration, the inclination angle is set to 5° or more to increase the sound spread. In this configuration, the inclination angle is set to 45° or less. This allows suppression of a decrease in sound pressure by using reverberation of sound between the pair of side surfaces.

In the electronic device according to a tenth aspect of the present disclosure, the third outer surface may include:

a right outer side surface located outside one end in a longitudinal direction of the keyboard; and a left outer side surface located outside the other end in the longitudinal direction of the keyboard, the left outer side surface being opposite to the right outer side surface, the recess may include:

a first recess opened to the right outer side surface; and a second recess opened to the left outer side surface, and the speaker unit may include:

a first speaker unit facing at least a part of a back surface of a surface of the first recess including the through hole; and a second speaker unit facing at least a part of a back surface of a surface of the second recess including the through hole.

This configuration allows sound pressure and sound quality of sound emitted by the speaker unit to be properly maintained in a 360-degree direction with the electronic device at the center, when the first housing is viewed from a direction orthogonal to the second outer surface.

An electronic device according to an eleventh aspect of the present disclosure may further includes a speaker box that is disposed inside the first housing and includes the speaker unit.

This configuration prevents sounds emitted from the front and the rear of the speaker unit from offsetting each other. Therefore, sound pressure and sound quality of the sound emitted by the speaker unit can be improved.

First Exemplary Embodiment

[Electronic Device]

Figure 2:
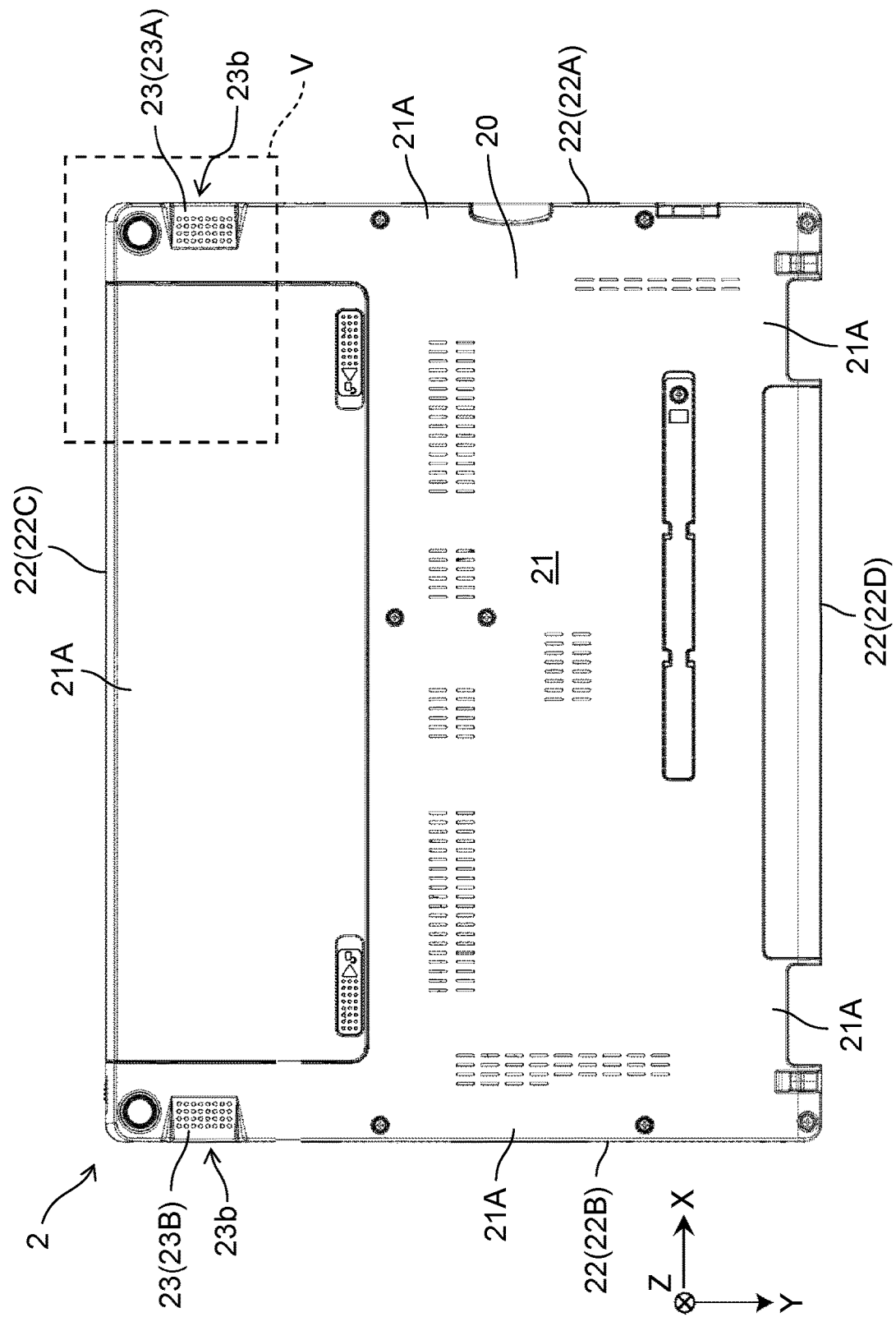
FIG. 2 is a bottom view of a first housing of the electronic device of FIG. 1.

FIG. 1 is a perspective view of one example of electronic device 1 according to a first exemplary embodiment of the present disclosure. FIG. 2 is a bottom view of housing 2 of the electronic device in FIG. 1. The X, Y, and Z-directions in the drawing indicate a width direction, a depth direction, and a height direction of housing 2, respectively.

As shown in FIG. 1, electronic device 1 is a notebook personal computer (laptop PC). Electronic device 1 includes housing 2 and housing 3. Housing 2 is one example of a first housing. Housing 3 is one example of a second housing. Each of housings 2, 3 has a thin box-shaped outer shell, and has a rectangular shape when viewed from the upper surface side.

Housing 2 houses keyboard 4 and touch pad 5. Housing 3 houses liquid crystal panel 6. Liquid crystal panel 6 is one example of a display. In the present description, keyboard 4 and touch pad 5 may be referred to as input units 4, 5, and liquid crystal panel 6 may be referred to as display 6.

Housings 2, 3 are connected via hinge 7. Hinge 7 is provided at an end in the depth direction (Y-direction) of housing 2. Hinge 7 rotatably connects housings 2, 3. At least one of housings 2, 3 is rotated by hinge 7, and electronic device 1 can be opened and closed. Specifically, electronic device 1 can be brought into an open state and a closed state by hinge 7. The "open state" is a state in which housings 2, 3 are separated from each other, and input units 4, 5 and display 6 are exposed. The "closed state" is a state in which housings 2, 3 are disposed to face each other, input units 4, 5 and display 6 face each other, and input units 4, 5 and display 6 are not exposed.

Housing 2 includes cases 10, 20. Cases 10, 20 are fitted to each other. Cases 10, 20 are made of a metal material. Examples of the metal material include a material such as a magnesium alloy.

Case 10 faces housing 3 when electronic device 1 is in the closed state. Case 20 is located on the opposite side of housing 3 with respect to case 10 when electronic device 1 is in the closed state. In the outer peripheral part of housing 2, cases 10, 20 are fixed to each other by a plurality of screws.

A space between cases 10, 20 is an internal space of housing 2. Keyboard 4 and touch pad 5 are housed in this internal space.

Case 10 has outer surface 11. Outer surface 11 is one example of the first outer surface. Outer surface 11 faces liquid crystal panel 6 of housing 3 when electronic device 1 is in the closed state.

Two openings are formed in outer surface 11. Keyboard 4 is exposed to the outside of housing 2 through the larger one of the two openings. Touch pad 5 is exposed to the outside of housing 2 through the smaller one of the two openings. That is, keyboard 4 and touch pad 5 are disposed on outer surface 11.

As shown in FIG. 1 and FIG. 2, case 20 has outer surfaces 21 and 22. Outer surface 21 is one example of the second outer surface. Outer surface 22 is one example of the third outer surface.

Outer surface 21 faces away from outer surface 11 of case 10. When electronic device 1 is in the closed state, outer surface 21 is located on the opposite side of housing 3 with respect to outer surface 11 of case 10.

Outer surface 22 protrudes in a direction (Z-direction) from peripheral edge 21A of outer surface 21 toward peripheral edge 11A of outer surface 11 of case 10. As shown in FIG. 2, peripheral edge 21A of outer surface 21 indicates a border of outer surface 21 and the vicinity of the border. As shown in FIG. 1, peripheral edge 11A of outer surface 11 indicates a border of outer surface 11 and the vicinity of the border. Outer surface 22 protrudes to a position in contact with peripheral edge 11A of outer surface 11 of case 10 or in the vicinity of the position. That is, outer surface 22 is located between peripheral edge 11A of outer surface 11 and peripheral edge 21A of outer surface 21.

As shown in FIG. 1 and FIG. 2, outer surface 22 includes right outer side surface 22A, left outer side surface 22B, front outer side surface 22C, and rear outer side surface 22D. Note that in the present description, when housing 2 is viewed in the depth direction (Y-direction), outer surface 22 on the right side is defined as right outer side surface 22A, and outer surface 22 on the left side is defined as left outer side surface 22B.

Right outer side surface 22A protrudes in the height direction (Z-direction) from one end in the width direction (X-direction) of outer surface 21 and extends in the depth direction (Y-direction) of outer surface 21. Left outer side surface 22B faces away from right outer side surface 22A. Left outer side surface 22B protrudes in the height direction (Z-direction) from the other end in the width direction (X-direction) of outer surface 21, and extends in the depth direction (Y-direction) of outer surface 21.

Front outer side surface 22C protrudes in the height direction (Z-direction) from an end in the depth direction (Y-direction) of outer surface 21 on a side opposite to hinge 7, and extends in the width direction (X-direction) of outer surface 21. Front outer side surface 22C connects right outer side surface 22A and left outer side surface 22B.

Rear outer side surface 22D protrudes in the height direction (Z-direction) from an end in the depth direction (Y-direction) of the outer surface 21 on hinge 7 side, and extends in the width direction (X-direction) of outer surface 21. Rear outer side surface 22D connects right outer side surface 22A and left outer side surface 22B.

When housing 2 is viewed in the height direction (Z-direction), outer surface 22 is located outside keyboard 4. That is, right outer side surface 22A is located outside one end in the longitudinal direction (X-direction) of keyboard 4. The longitudinal direction of keyboard 4 corresponds to the width direction (X-direction) of housing 2. Left outer side surface 22B is located outside the other end in the longitudinal direction of keyboard 4. Front outer side surface 22C is located outside an end in the lateral direction of keyboard 4 on a side opposite to hinge 7. The lateral direction of keyboard 4 corresponds to the depth direction (Y-direction) of housing 2. Rear outer side surface 22D is located outside an end in the lateral direction of keyboard 4 on hinge 7 side.

Recess 23 is formed on outer surface 21 of housing 2. In the first exemplary embodiment, recess 23 includes two recesses 23A, 23B. Recess 23A is one example of the first recess. Recess 23B is one example of the second recess. In the first exemplary embodiment, the depths of recesses 23A, 23B are set to 1 mm or more. As a result, when electronic device 1 is used on the knee or the like, recesses 23A, 23B are prevented from being blocked by the knee or the like from below. The depths of recesses 23A, 23B may be less than 1 mm.

As shown in FIG. 2, recess 23 is formed on peripheral edge 21A of outer surface 21. As shown in FIG. 1, recess 23 is formed at an end on a side opposite to hinge 7 in the depth direction (Y-direction) of housing 2. As shown in FIG. 2, recess 23A is formed at one end in the width direction (X-direction) of housing 2. Recess 23B is formed at the other end in the width direction (X-direction) of housing 2. The position of recess 23A in the width direction (X-direction) is the same as the position of recess 23B in the width direction (X-direction).

Figure 3:
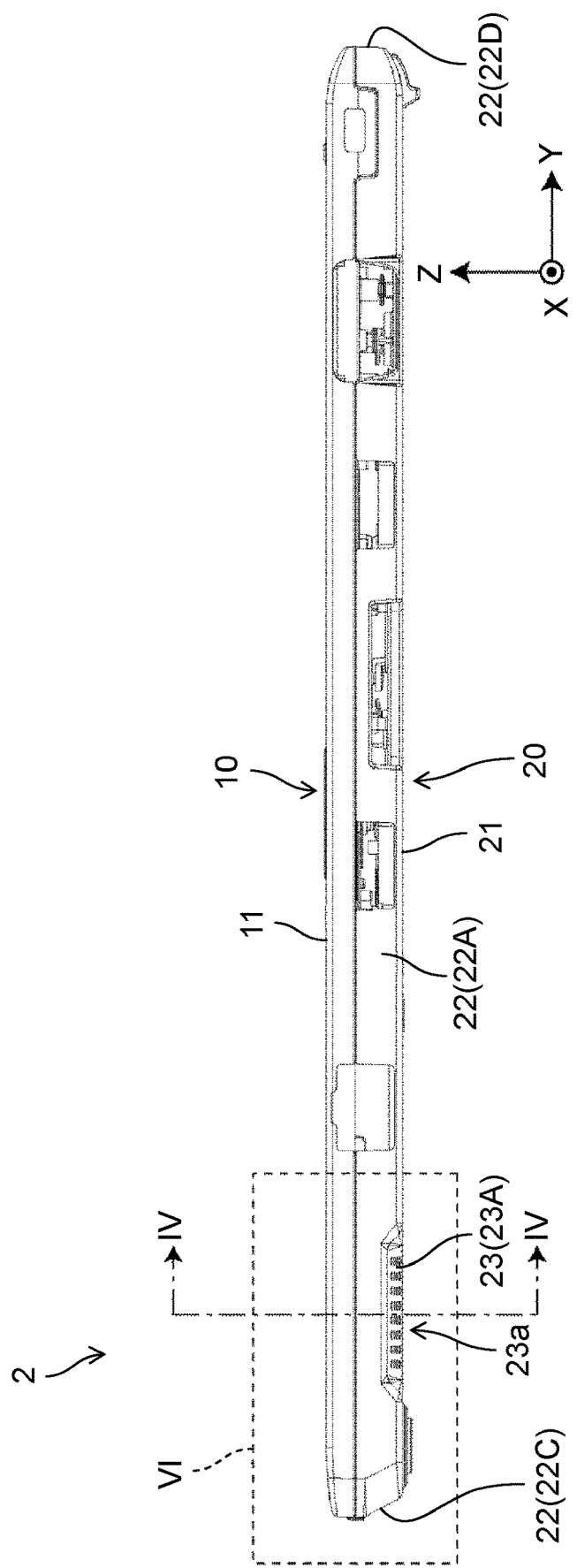
FIG. 3 is a right side view of a first housing of the electronic device of FIG. 1.
Figure 4:
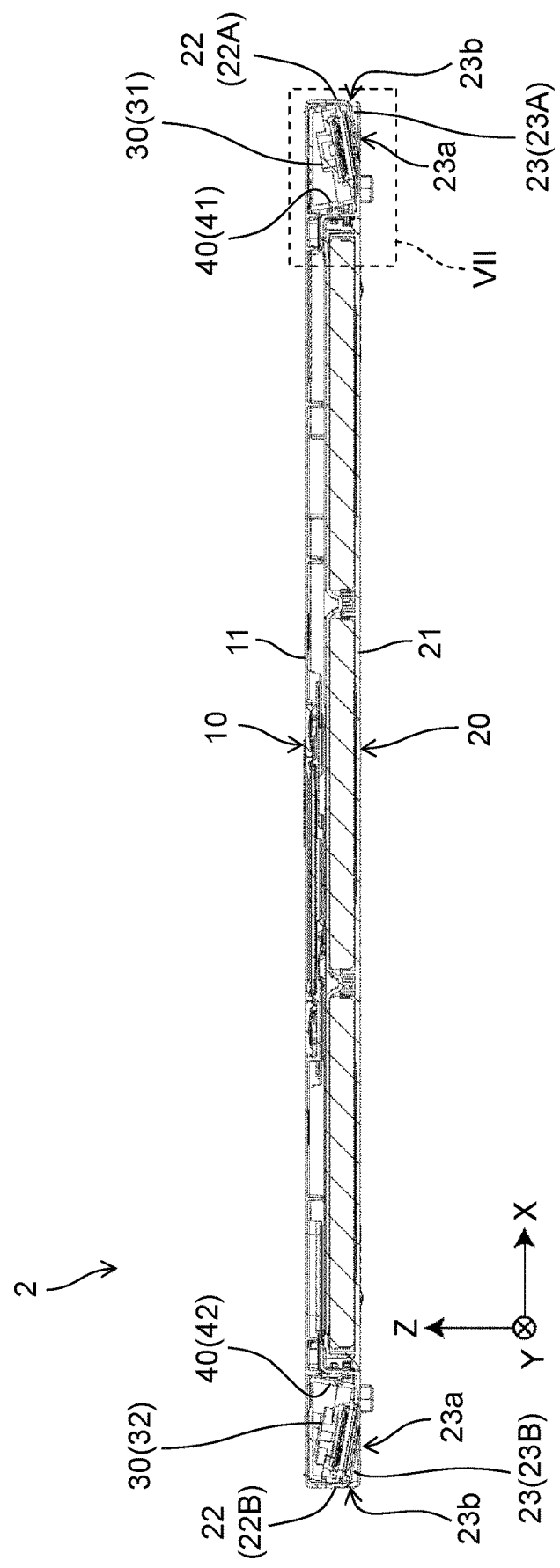
FIG. 4 is a cross-sectional view of the first housing of the electronic device of FIG. 3 taken along line IV-IV.

FIG. 3 is a right side view of the first housing of the electronic device of FIG. 1. FIG. 4 is a cross-sectional view of the first housing of the electronic device of FIG. 3 taken along line IV-IV.

As shown in FIG. 3 and FIG. 4, recesses 23A, 23B open below housing 2 (in a direction opposite to the Z-direction). In other words, recesses 23A, 23B open to outer surface 21. That is, each of recesses 23A, 23B has opening 23a.

As shown in FIG. 2 and FIG. 4, recesses 23A, 23B open in the width direction (X-direction) of housing 2. In other words, recesses 23A, 23B open to outer surface 22. Recess 23A opens to right outer side surface 22A, and recess 23B opens to left outer side surface 22B. Each of recesses 23A, 23B has opening 23b. Openings 23a, 23b are continuous.

Hereinafter, the configuration of the recess 23A will be described in more detail. Note that recess 23B has the same configuration as recess 23A except that recess 23B faces a direction opposite to recess 23A in the width direction (X-direction) of housing 2. Therefore, a detailed description of the configuration of recess 23B is omitted.

Figure 5:
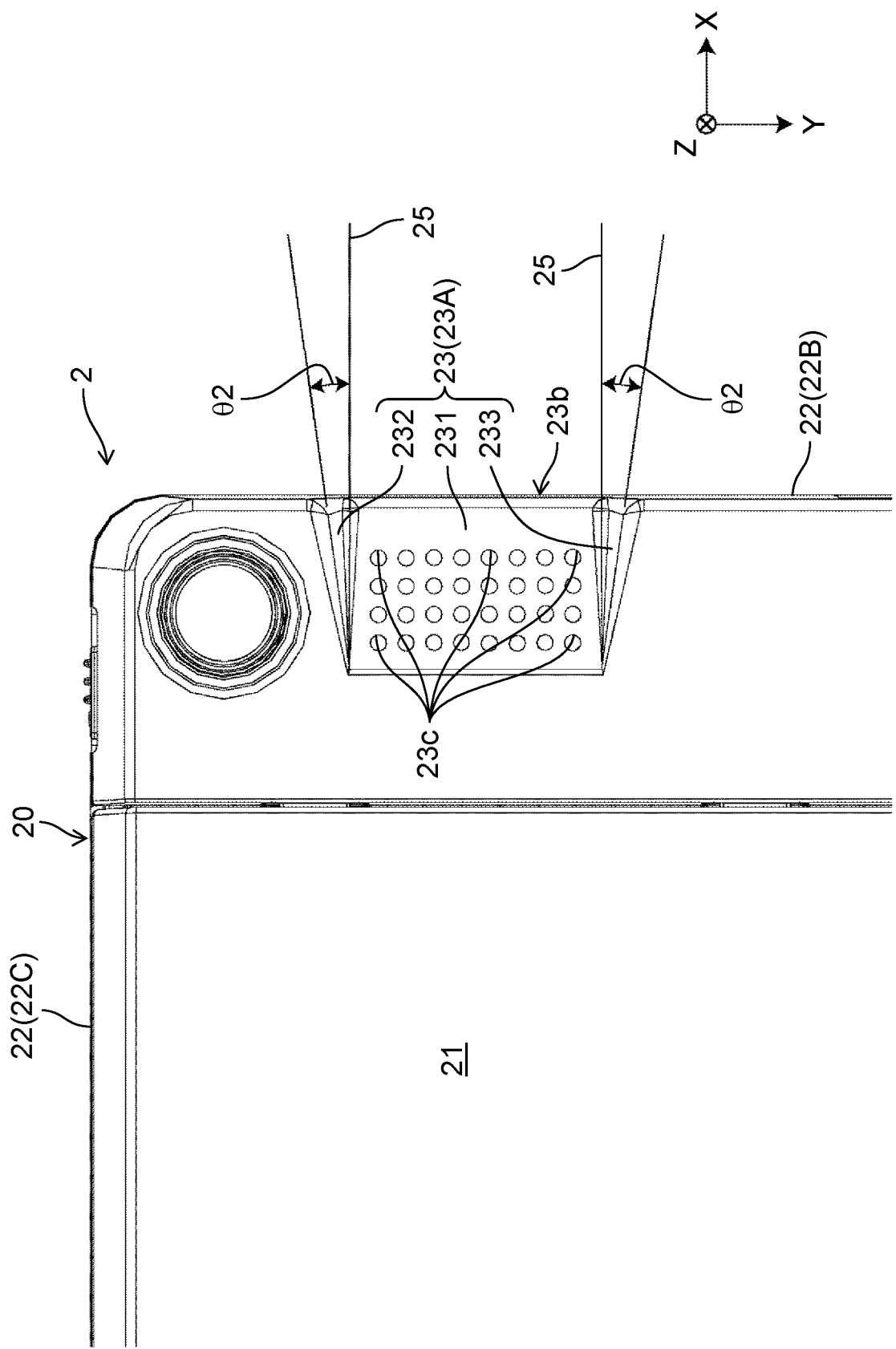
FIG. 5 is an enlarged view of a part V in FIG. 2.
Figure 6:
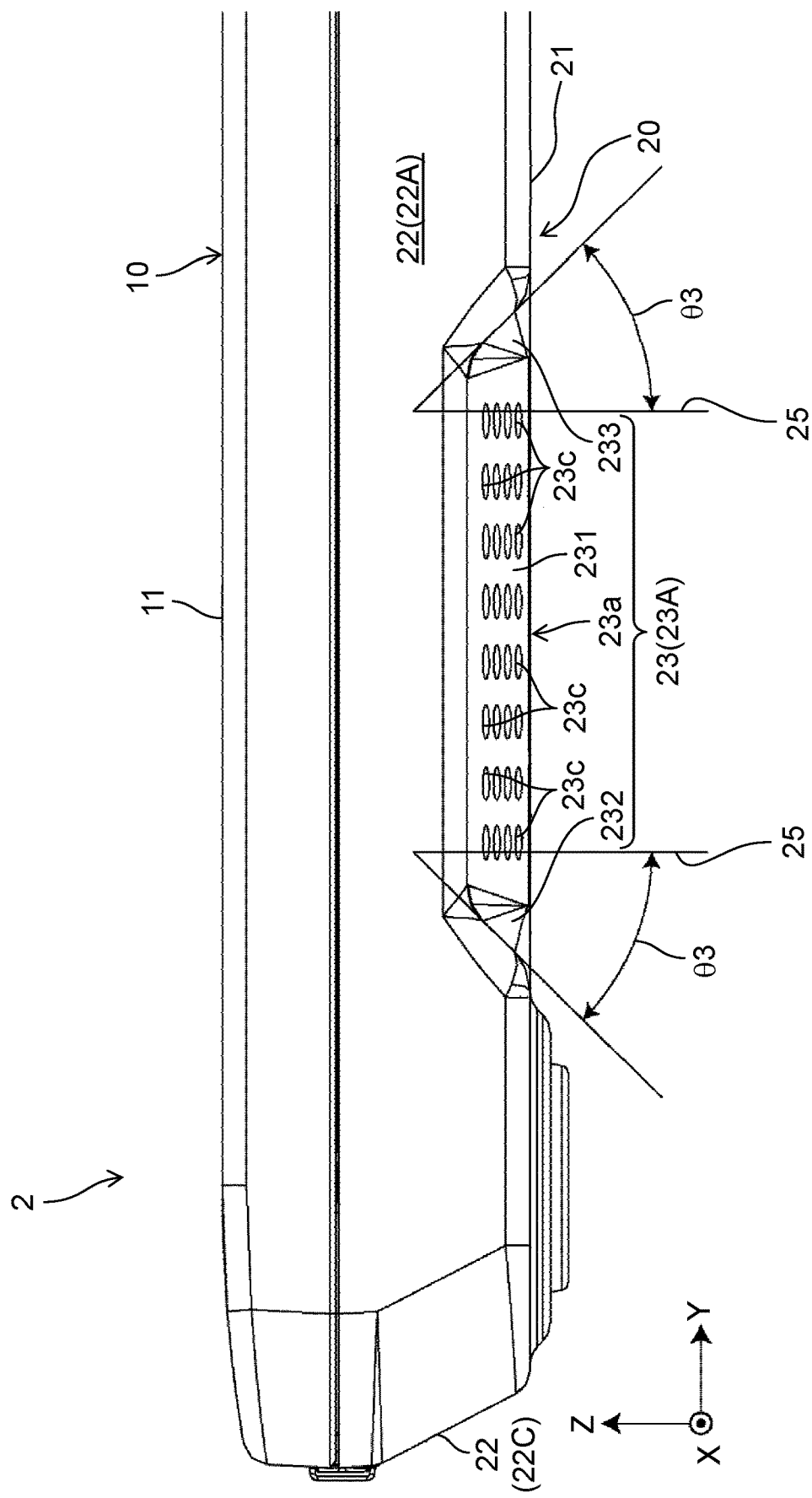
FIG. 6 is an enlarged view of a part VI in FIG. 3.
Figure 7:
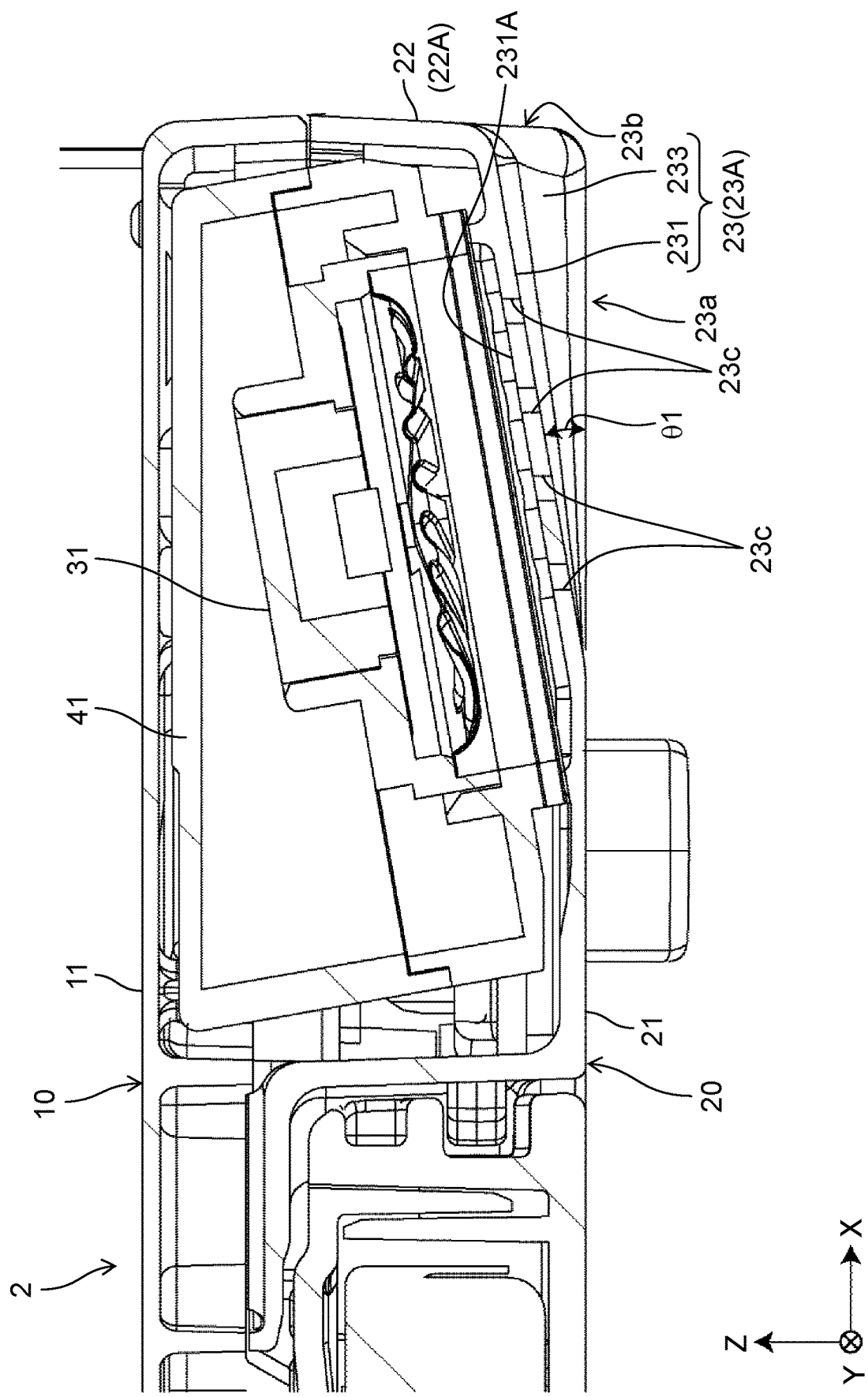
FIG. 7 is an enlarged view of a part VII in FIG. 4.

FIG. 5 is an enlarged view of a part V in FIG. 2. FIG. 6 is an enlarged view of a part VI in FIG. 3. FIG. 7 is an enlarged view of a part VII in FIG. 4.

As shown in FIG. 5 and FIG. 6, recess 23A has bottom surface 231 and a pair of side surfaces 232, 233 as surfaces constituting recess 23A. Bottom surface 231 and the pair of side surfaces 232, 233 are one example of surfaces of the recess.

Bottom surface 231 is continuous with outer surface 21, right outer side surface 22A, and the pair of side surfaces 232, 233.

As shown in FIG. 5, one end in the width direction (X-direction) of bottom surface 231 is continuous with outer surface 21. As shown in FIG. 6, the other end in the width direction (X-direction) of bottom surface 231 of recess 23A is continuous with right outer side surface 22A.

As shown in FIG. 5 and FIG. 6, bottom surface 231 is sandwiched between the pair of side surfaces 232, 233 on both sides in the depth direction (Y-direction) of housing 2. An end on front outer side surface 22C side in the depth direction (Y-direction) of bottom surface 231 is continuous with side surface 232. An end on a side opposite to front outer side surface 22C in the depth direction (Y-direction) of bottom surface 231 is continuous with side surface 233.

As shown in FIG. 7, bottom surface 231 is inclined away from outer surface 21 in the height direction (Z-direction) of housing 2 from one end toward the other end in the width direction (X-direction) of bottom surface 231. In other words, bottom surface 231 is inclined toward right outer side surface 22A in a direction (Z-direction) approaching outer surface 11 of housing 3. Inclination angle θ1 of bottom surface 231 with respect to outer surface 21 is, for example, 10°. In the first exemplary embodiment, inclination angle θ1 is 10°, and may not be 10°. For example, inclination angle θ1 may be any angle of 1° or more and 45° or less.

As shown in FIG. 5, twenty-eight through holes 23c are formed in bottom surface 231. Twenty-eight through holes 23c are arranged in a grid pattern. Twenty-eight through holes 23c are formed in a region excluding the other end in the width direction (X-direction) of bottom surface 231. That is, twenty-eight through holes 23c are formed in a partial region of bottom surface 231.

The number of through holes 23c is not limited to twenty-eight, and may be one or forty, for example. The arrangement of through holes 23c is not limited to a grid pattern. For example, through holes 23c may be arranged in a row or in a circular array.

It is sufficient that through hole 23c is formed in at least a part of the surface of recess 23. For example, through hole 23c may be formed in the entire region of bottom surface 231.

As shown in FIG. 5 and FIG. 6, the pair of side surfaces 232, 233 of recess 23A are continuous with bottom surface 231, outer surface 21, and right outer side surface 22A, respectively.

As shown in FIG. 5, the pair of side surfaces 232, 233 is sandwiched between bottom surface 231 and outer surface 21 on both sides in the depth direction (Y-direction) of housing 2. Ends in the width direction (X-direction) of the pair of side surfaces 232, 233 of recess 23A are continuous with the right outer side surface 22A, respectively.

As shown in FIG. 5, side surface 232 is inclined away from side surface 233 in the depth direction (Y-direction) of housing 2 toward right outer side surface 22A in the width direction (X-direction) of side surface 232. Side surface 233 is inclined away from side surface 232 in the depth direction (Y-direction) of housing 2 toward right outer side surface 22A in the width direction (X-direction) of side surface 233. That is, the pair of side surfaces 232, 233 is inclined in a direction where the distance between the pair of side surfaces 232, 233 increases toward right outer side surface 22A.

As shown in FIG. 6, side surface 232 is inclined away from side surface 233 in the depth direction (Y-direction) of housing 2 as being away from bottom surface 231 in the height direction (Z-direction) of housing 2. Side surface 233 is inclined away from side surface 232 in the depth direction (Y-direction) of housing 2 as being away from bottom surface 231 in the height direction (Z-direction) of housing 2. That is, the pair of side surfaces 232, 233 is inclined in a direction where the distance between the pair of side surfaces 232, 233 increases toward outer surface 21.

As described above, the pair of side surfaces 232, 233 of recess 23A and recess 23B is inclined in a direction where the distance between the pair of side surfaces 232, 233 increases toward right outer side surface 22A and left outer side surface 22B, respectively, and is inclined in a direction where the distance between the pair of side surfaces 232, 233 increases toward outer surface 21, as illustrated in FIG. 5 and FIG. 6.

As illustrated in FIG. 5, inclination angle θ2 of each of the pair of side surfaces 232, 233 inclined in the direction where the distance between the pair of side surfaces 232,233 increases toward right outer side surface 22A with respect to virtual plane 25 is, for example, 10°. Virtual plane 25 is a plane orthogonal to outer surface 21 and right outer side surface 22A. In the first exemplary embodiment, inclination angle θ2 is 10°, and may not be 10°. For example, inclination angle θ2 may be any angle of 5° or more and 45° or less.

As illustrated in FIG. 6, inclination angle θ3 of each of the pair of side surfaces 232, 233 inclined in the direction where the distance between the pair of side surfaces 232, 233 increases toward outer surface 21 with respect to virtual plane 25 is, for example, 30°. Inclination angle θ3 is 30°, and may not be 30°. For example, inclination angle θ3 may be any angle of 5° or more and 45° or less.

Figure 8:
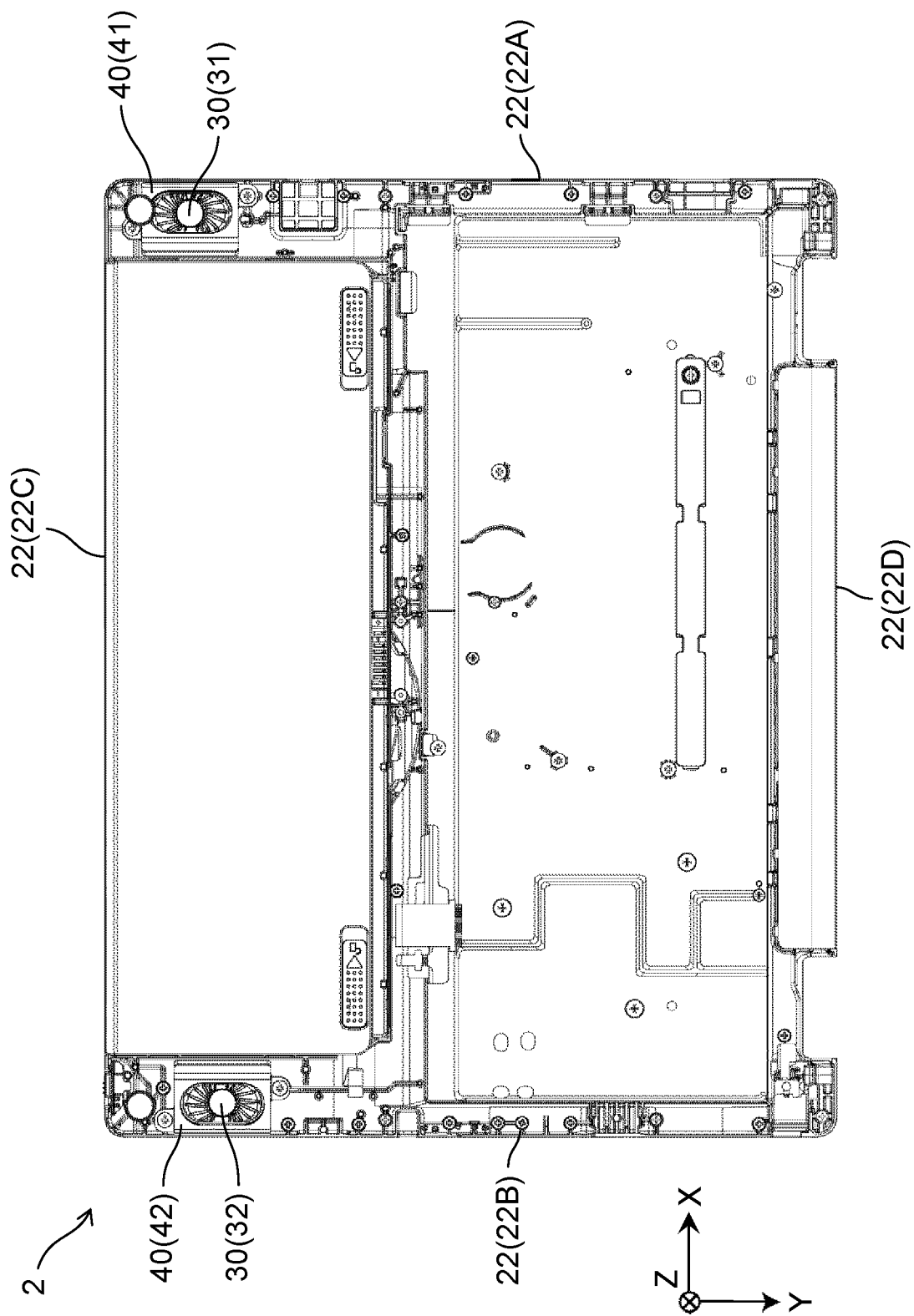
FIG. 8 is a view showing an internal space of a first housing of the electronic device of FIG. 2 except for a part of the first housing.

FIG. 8 is a view showing an internal space of a first housing of the electronic device of FIG. 2 except for a part of the first housing.

As illustrated in FIG. 4 and FIG. 8, speaker unit 30 and speaker box 40 are housed in the internal space of housing 2. In the first exemplary embodiment, speaker unit 30 includes two speaker units 31, 32, and speaker box 40 includes two speaker boxes 41, 42. Speaker unit 31 is one example of the first speaker unit. Speaker unit 32 is one example of the second speaker unit.

Each of speaker units 31, 32 includes a diaphragm, a magnetic circuit, and the like. Since the configurations of speaker units 31, 32 are known, detailed description of the configurations of speaker units 31, 32 is omitted in the present description.

Speaker boxes 41, 42 are hollow and have a substantially rectangular parallelepiped shape. Speaker boxes 41, 42 have openings. Speaker unit 31 is fitted into the opening of speaker box 41. This allows speaker unit 31 to be mounted in speaker box 41. Speaker unit 32 is fitted into the opening of speaker box 42. This allows speaker unit 32 to be mounted in speaker box 42.

In the first exemplary embodiment, one speaker unit is mounted in one speaker box. That is, in the first exemplary embodiment, the full-range speaker is housed in housing 2. However, a plurality of speaker units may be mounted in one speaker box. That is, a two-way speaker, a three-way speaker, and the like may be housed in housing 2. The speaker box may have a through hole for communicating between the inside and the outside of the speaker box, in addition to a location where the speaker unit is mounted. As a result, speaker unit 30 and speaker box 40 constitute a bass-reflex type speaker.

As shown in FIG. 8, speaker unit 31 and speaker box 41 are disposed at an end on a side opposite to hinge 7 in the depth direction (Y-direction) of housing 2, which is one end in the width direction (X-direction) of housing 2. As shown in FIG. 7, speaker unit 31 is disposed at a position facing back surface 231A of bottom surface 231 which is a surface of recess 23A and where through hole 23c is formed. In the first exemplary embodiment, speaker unit 31 faces a region of back surface 231A where through hole 23c is formed.

Note that it is not always necessary that entire speaker unit 31 is disposed at a position facing entire back surface 231A. That is, it is sufficient that at least a part of speaker unit 31 is disposed at a position facing at least a part of back surface 231A. Further, it is not always necessary that entire speaker unit 31 is disposed at a position facing a region of back surface 231A where through hole 23c is formed, and a part of speaker unit 31 may be disposed at a position facing a part of the region.

As shown in FIG. 8, speaker unit 32 and speaker box 42 are disposed at an end on a side opposite to hinge 7 in the depth direction (Y-direction) of housing 2, which is the other end in the width direction (X-direction) of housing 2. Speaker unit 32 is disposed in the same manner as speaker unit 31. That is, speaker unit 32 is disposed at a position facing back surface of bottom surface 231 which is a surface of recess 23B and where through hole 23c is formed.

Note that it is not always necessary that entire speaker unit 32 is disposed at a position facing the entire back surface of bottom surface 231. That is, it is sufficient that at least a part of speaker unit 32 is disposed at a position facing at least a part of the back surface of bottom surface 231. Further, it is not always necessary that entire speaker unit 32 is disposed at a position facing a region of the back surface of bottom surface 231 where through hole 23c is formed, and a part of speaker unit 32 may be disposed at a position facing a part of the region.

[Effects]

According to electronic device 1 of the first exemplary embodiment, the following effects can be obtained.

Electronic device 1 includes housings 2, 3 and speaker unit 30. Housing 2 has outer surface 11 on which keyboard 4 is disposed and outer surface 21 opposite to outer surface 11. Housing 3 houses liquid crystal panel 6 and is connected to housing 2. Speaker unit 30 is disposed inside housing 2. Recess 23 is formed on outer surface 21. Through hole 23c is formed in bottom surface 231 of recess 23. At least a part of speaker unit 30 faces at least a part of back surface 231A of bottom surface 231 of recess 23 where through hole 23c is formed.

This configuration reduces the possibility of through hole 23c being blocked by the knee or the like of the user. Therefore, a decrease in sound pressure of sound emitted by speaker unit 30 can be suppressed.

Housing 2 has outer surface 22 located between peripheral edge 11A of outer surface 11 and peripheral edge 21A of outer surface 21. Recess 23 is open to outer surface 22.

This configuration allows recess 23 to open to outer surface 22 in addition to outer surface 21. This allows the sound emitted by speaker unit 30 to be transmitted to the outside of electronic device 1 through opening 23b in outer surface 22.

Recess 23 has bottom surface 231 that is continuous with outer surface 22. Bottom surface 231 is inclined toward outer surface 22 in a direction approaching outer surface 11.

This configuration causes the distance between bottom surface 231 of recess 23 and outer surface 21 to become wider in the direction toward outer surface 22. Consequently, sound of speaker unit 30 transmitted to the outside of the electronic device through opening 23b of outer surface 22 can be spread in recess 23. Therefore, sound pressure and sound quality of the sound emitted by speaker unit 30 can be improved.

Inclination angle θ1 of bottom surface 231 with respect to outer surface 21 is 1° or more and 45° or less.

When electronic device 1 is used on a desk, on a knee, or the like, sound emitted from speaker unit 30 toward the desk, the knee, or the like are reflected by the desk, the knee, or the like. In a case where inclination angle θ1 is 0°, most of the sound reflected by the desk, the knee, and the like hits bottom surface 231. As a result, the sound becomes muffled between the desk, the knee, and the like and bottom surface 231, and may be difficult to reach the user's ear. On the other hand, in a case where inclination angle θ1 is larger than 45°, the sound easily escapes in the horizontal direction, and the sound pressure may decrease. In contrast, in this configuration, it is possible to reduce the sound that hits the bottom surface 231 by setting the inclination angle θ1 to 1° or more. In addition, in this configuration, inclination angle θ1 is set to 45° or less, so that it is possible to suppress a decrease in sound pressure by using reverberation of sound between the desk, the knee, and the like and bottom surface 231.

In this configuration, inclination angle θ1 is set to 45° or less. Therefore, it is possible to greatly synergize the effect of reverberation of sound based on inclination angle θ1 with the effect of reverberation of sound between the pair of side surfaces 232, 233 based on inclination angle θ2 and the effect of reverberation of sound between the pair of side surfaces 232, 233 based on inclination angle θ3.

Recess 23 has a pair of side surfaces 232, 233 facing each other and each continuous with outer surfaces 21, 22. The pair of side surfaces 232, 233 is inclined in a direction where the distance between the pair of side surfaces 232, 233 increases toward outer surface 21, and is inclined in a direction where the distance between the pair of side surfaces 232, 233 increases toward outer surface 22.

This configuration causes the distance between the pair of side surfaces 232, 233 to become wider in the direction toward outer surface 21 and in the direction toward outer surface 22. Consequently, sound of speaker unit 31 transmitted to the outside of electronic device 1 through opening 23a in outer surface 21 and opening 23b in outer surface 22 can be spread in recess 23. Therefore, sound pressure and sound quality of the sound emitted by speaker unit 31 can be improved.

Inclination angle θ2 of each of the pair of side surfaces 232, 233 inclined in the direction where the distance between the pair of side surfaces 232, 233 increases toward outer surface 22 with respect to virtual plane 25 orthogonal to outer surfaces 21, 22 is 5° or more and 45° or less.

In this configuration, inclination angle θ2 is set to 5° or more to increase the sound spread in the Y-direction. In this configuration, inclination angle θ2 is set to 45° or less. This allows suppression of a decrease in sound pressure by using reverberation of sound between the pair of side surfaces 232, 233. In this configuration, inclination angle θ2 is set to 45° or less. Therefore, it is possible to greatly synergize the effect of reverberation of sound based on inclination angle θ2 with the effect of reverberation of sound between the desk, the knee, and the like on which electronic device 1 is placed and bottom surface 231 and the effect of reverberation of sound between the pair of side surfaces 232, 233 based on inclination angle θ3.

Inclination angle θ3 of each of the pair of side surfaces 232, 233 inclined in the direction where the distance between the pair of side surfaces 232, 233 increases toward outer surface 21 with respect to virtual plane 25 orthogonal to outer surfaces 21, 22 is 5° or more and 45° or less.

In this configuration, inclination angle θ3 is set to 5° or more to increase the sound spread in the Z-direction. In this configuration, inclination angle θ3 is set to 45° or less. This allows suppression of a decrease in sound pressure by using reverberation of sound between the pair of side surfaces 232, 233. In this configuration, inclination angle θ3 is set to 45° or less. Therefore, it is possible to greatly synergize the effect of reverberation of sound based on inclination angle θ3 with the effect of reverberation of sound between the desk, the knee, and the like on which electronic device 1 is placed and bottom surface 231 and the effect of reverberation of sound between the pair of side surfaces 232, 233 based on inclination angle θ2.

Outer surface 22 includes right outer side surface 22A located outside one end in a longitudinal direction of keyboard 4 and left outer side surface 22B located outside the other end in the longitudinal direction of keyboard 4 and opposite to the right outer side surface 22A. Recess 23 includes recess 23A opened to right outer side surface 22A and recess 23B opened to left outer side surface 22B. Speaker unit 30 includes speaker unit 31 facing at least a part of back surface 231A of bottom surface 231 of recess 23A where through hole 23c is formed, and speaker unit 32 facing at least a part of the back surface of bottom surface 231 of recess 23B where through hole 23c is formed.

This configuration allows sound pressure and sound quality of sound emitted by speaker units 31, 32 to be properly maintained in a 360-degree direction with electronic device 1 at the center, when housing 2 is viewed from a direction orthogonal to outer surface 21 (Z-direction).

Electronic device 1 further includes speaker boxes 41, 42 which are disposed inside housing 2 and to which speaker units 31, 32 are respectively mounted.

This configuration prevents sounds emitted from the front and the rear of speaker units 31, 32 from offsetting each other. Therefore, sound pressure and sound quality of the sound emitted by speaker units 31, 32 can be improved.

In first exemplary embodiment, recess 23 has bottom surface 231 and a pair of side surfaces 232, 233. However, the configuration of recess 23 is not limited thereto. For example, recess 23 may have a bottom surface that is a rectangle in plan view and four side surfaces extending from all four sides of the rectangle of the bottom surface. For example, at least a part of the surface constituting recess 23 may be curved. For example, recess 23 may be formed of a spherical surface.

In the first exemplary embodiment, recesses 23A, 23B are formed at ends on a side opposite to hinge 7 in the depth direction (Y-direction) of housing 2, which are two ends in the width direction (X-direction) of housing 2. However, recesses 23A, 23B may be formed at positions other than the above positions.

For example, recesses 23A, 23B may be formed at an end on hinge 7 side in the depth direction (Y-direction) or in the center of housing 2 in the depth direction (Y-direction).

For example, the position of recess 23A in the depth direction (Y-direction) may be different from the position of recess 23B in the depth direction (Y-direction).

For example, recesses 23A, 23B may be formed in the center of outer surface 21 of housing 2, rather than at peripheral edge 21A of outer surface 21 of housing 2. In this case, recesses 23A, 23B each have opening 23a, but no opening 23b.

In the first exemplary embodiment, recess 23A is open to right outer side surface 22A, and recess 23B is open to left outer side surface 22B. However, recesses 23A, 23B may be opened to front outer side surface 22C of housing 2 or to rear outer side surface 22D of housing 2. When recesses 23A, 23B are formed in the center of outer surface 21 of housing 2, as described above, recesses 23A, 23B do not open to outer surface 22.

In the first exemplary embodiment, two recesses 23,24 are formed on outer surface 21 of housing 2, but the number of recesses is not limited to two. On outer surface 21 of housing 2, one recess may be formed, or three or more recesses may be formed. In this case, speaker unit 30 and speaker box 40 are disposed in correspondence with each recess.

In the first exemplary embodiment, inclination angles θ2 of the pair of side surfaces 232, 233 are identical to each other, but inclination angles θ2 of the pair of side surfaces 232, 233 may not be identical to each other. Similarly, inclination angles θ3 of the pair of side surfaces 232, 233 are identical to each other, but inclination angles θ3 of the pair of side surfaces 232, 233 may not be identical to each other. For example, only one of the pair of side surfaces 232, 233 may be inclined with respect to virtual plane 25.

Figure 9:
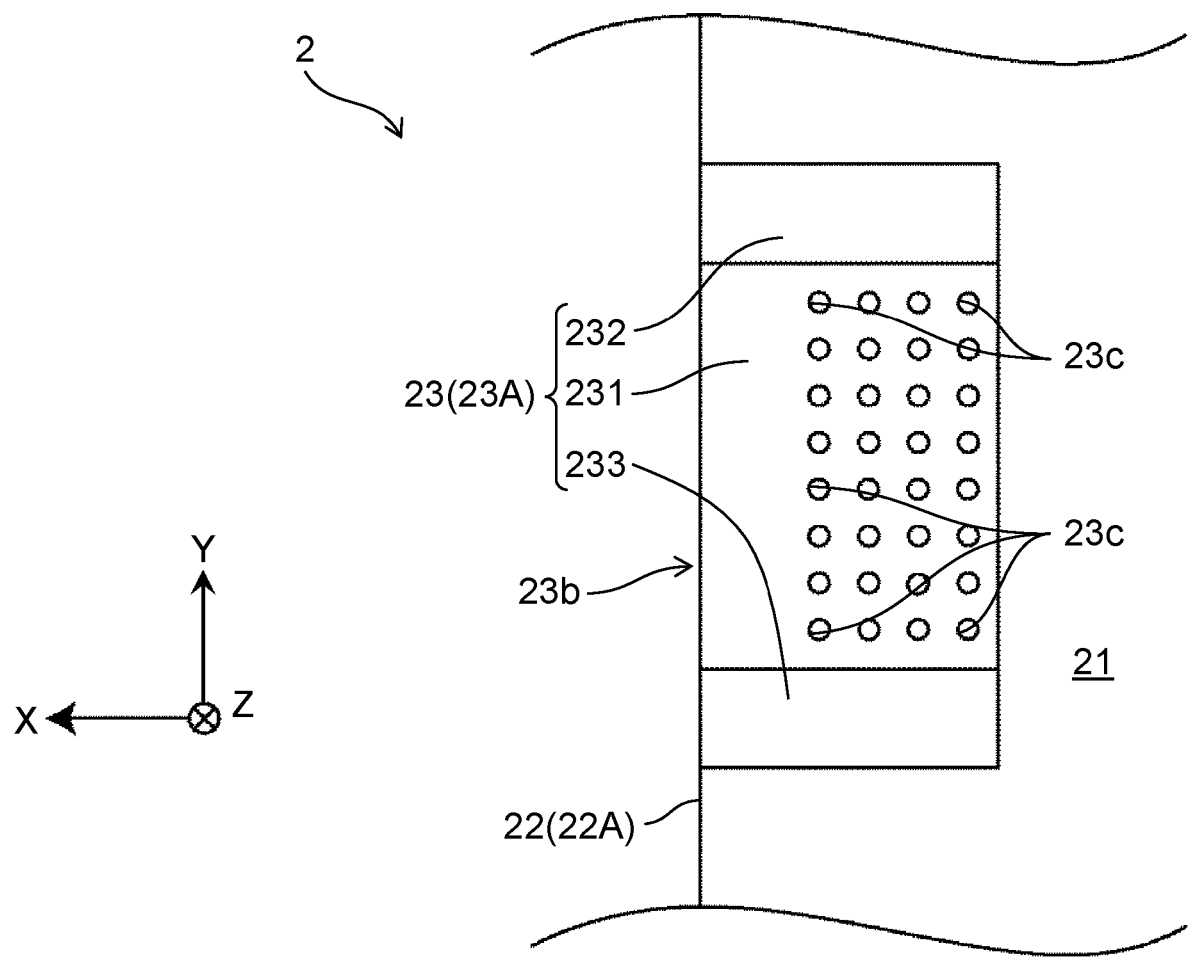
FIG. 9 is a schematic bottom view of the first housing showing a modification of the recess and its periphery in the first exemplary embodiment according to the present disclosure.
Figure 10:
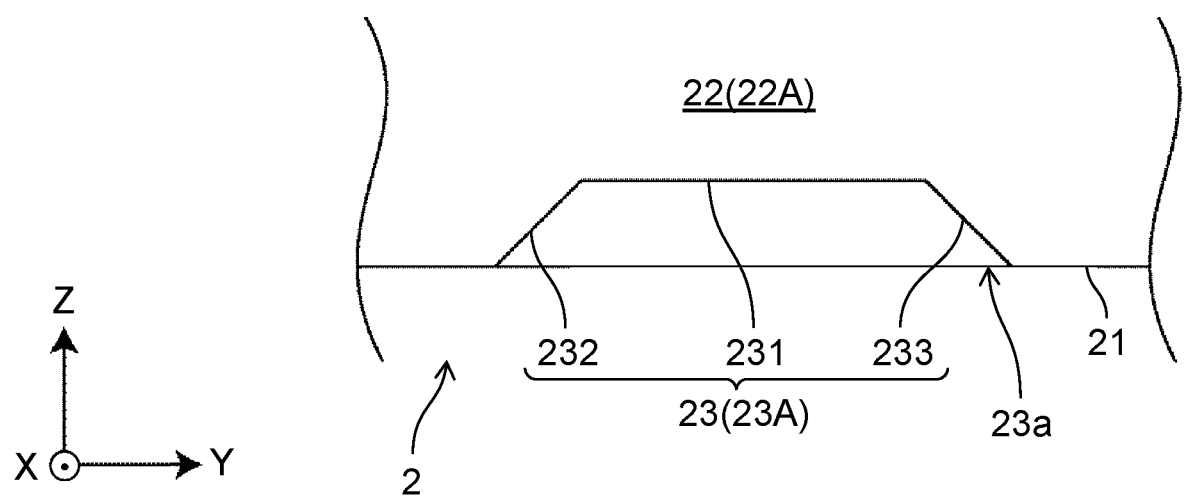
FIG. 10 is a schematic right side view of the first housing showing a modification of the recess and its periphery in the first exemplary embodiment according to the present disclosure.
Figure 11:
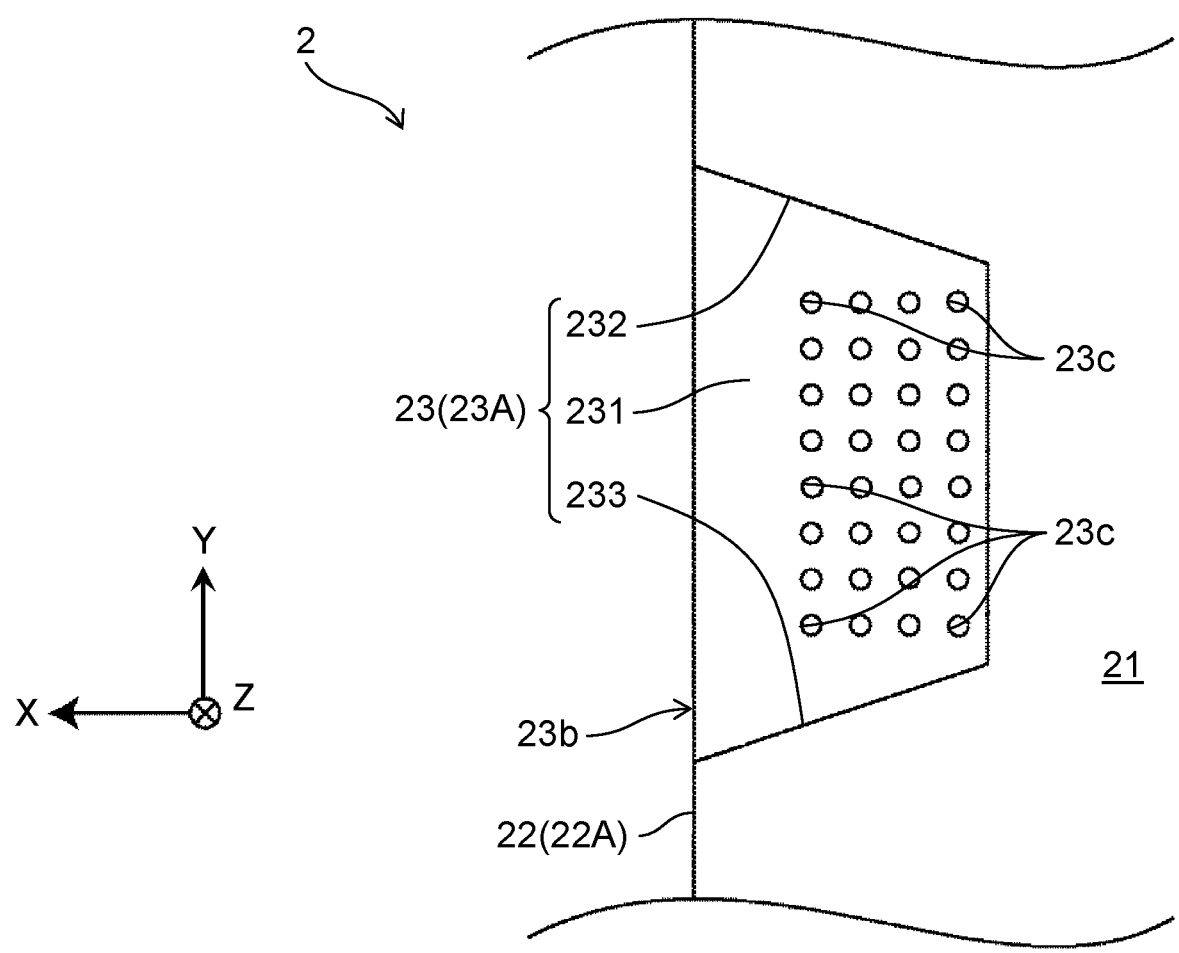
FIG. 11 is a schematic bottom view of the first housing showing a modification of the recess and its periphery in the first exemplary embodiment according to the present disclosure.
Figure 12:
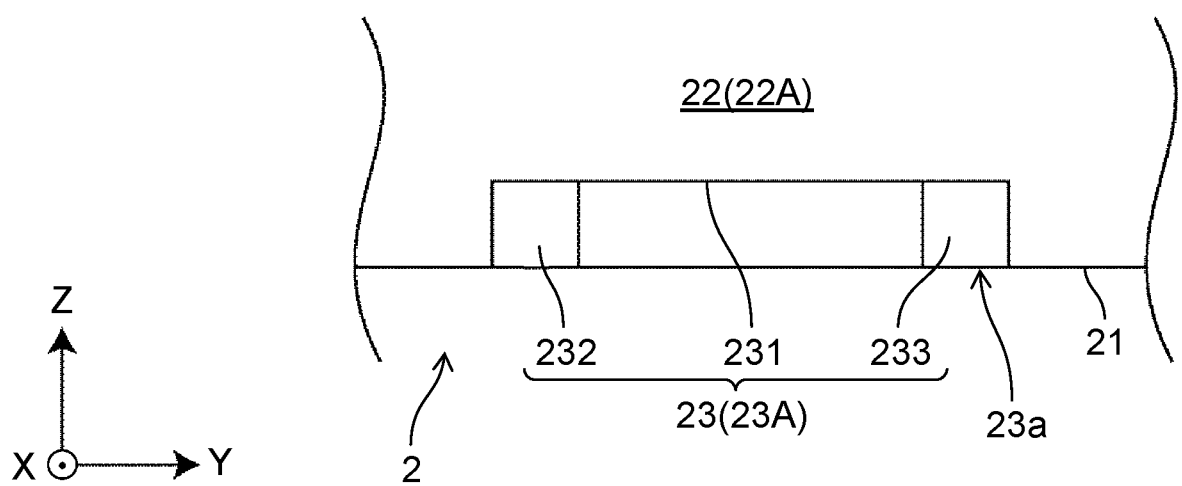
FIG. 12 is a schematic right side view of the first housing showing a modification of the recess and its periphery in the first exemplary embodiment according to the present disclosure.

FIG. 9 is a schematic bottom view of the first housing showing a modification of the recess and its periphery in the first exemplary embodiment according to the present disclosure. FIG. 10 is a schematic right side view of the first housing showing a modification of the recess and its periphery in the first exemplary embodiment according to the present disclosure. FIG. 11 is a schematic bottom view of the first housing showing a modification of the recess and its periphery in the first exemplary embodiment according to the present disclosure. FIG. 12 is a schematic right side view of the first housing showing a modification of the recess and its periphery in the first exemplary embodiment according to the present disclosure.

In the first exemplary embodiment, bottom surface 231 is inclined toward right outer side surface 22A in a direction approaching outer surface 11 of housing 3. The pair of side surfaces 232, 233 is inclined in a direction where the distance between the pair of side surfaces 232, 233 increases toward outer surface 21, and is inclined in a direction where the distance between the pair of side surfaces 232, 233 increases toward right outer side surface 22A.

However, as illustrated in FIG. 9 and FIG. 10, bottom surface 231 may not be inclined toward right outer side surface 22A in a direction approaching outer surface 11 of housing 2. In this case, the pair of side surfaces 232, 233 may be inclined in a direction where the distance between the pair of side surfaces 232, 233 increases toward outer surface 21 as illustrated in FIG. 10, and may not be inclined in a direction where the distance between the pair of side surfaces 232, 233 increases toward right outer side surface 22A as illustrated in FIG. 9.

As illustrated in FIG. 9 and FIG. 10, recess 23 has a pair of side surfaces 232, 233 facing each other and each continuous with outer surface 21. The pair of side surfaces 232, 233 is inclined in a direction where the distance between the pair of side surfaces 232, 233 increases toward outer surface 21.

This configuration causes the distance between the pair of side surfaces 232, 233 to become wider in the direction toward outer surface 21. Consequently, sound of speaker unit 30 transmitted to the outside of electronic device 1 through opening 23a of outer surface 21 can be spread in recess 23. Therefore, sound pressure and sound quality of the sound emitted by speaker unit 30 can be improved.

As illustrated in FIG. 11 and FIG. 12, bottom surface 231 may not be inclined toward right outer side surface 22A in a direction approaching outer surface 11 of housing 3. In this case, the pair of side surfaces 232,233 may be inclined in a direction where the distance between the pair of side surfaces 232, 233 increases toward right outer side surface 22A as illustrated in FIG. 11, and may not be inclined in a direction where the distance between the pair of side surfaces 232, 233 increases toward outer surface 21 as illustrated in FIG. 12.

As illustrated in FIG. 11 and FIG. 12, recess 23 has a pair of side surfaces 232, 233 facing each other and each continuous with outer surface 22. The pair of side surfaces 232, 233 is inclined in a direction where the distance between the pair of side surfaces 232, 233 increases toward outer surface 22.

This configuration causes the distance between the pair of side surfaces 232, 233 to become wider in the direction toward outer surface 22. Consequently, sound of speaker unit 30 transmitted to the outside of electronic device 1 through opening 23b of outer surface 22 can be spread in recess 23. Therefore, sound pressure and sound quality of the sound emitted by speaker unit 30 can be improved.

In the first exemplary embodiment, through hole 23c is formed only in bottom surface 231 of recess 23, but it is not limited to bottom surface 231 where through hole 23c is formed. For example, through hole 23c may be formed in both bottom surface 231 and the pair of side surfaces 232, 233, or may be formed only in the pair of side surfaces 232, 233. When through hole 23c is formed in a surface of recess 23 other than bottom surface 231, speaker unit 30 is disposed at a position facing the back surface of a surface of recess 23 where through hole 23c is formed. For example, when through hole 23c is formed in side surface 232 of recess 23, speaker unit 30 is disposed at a position facing the back surface of side surface 232.

In the first exemplary embodiment, speaker unit 30 and speaker box 40 are housed in the internal space of housing 2. However, electronic device 1 may not have speaker box 40. In this case, the internal space of housing 2 houses speaker unit 30, but does not house speaker box 40.

In the first exemplary embodiment, case 10 has outer surface 11 and case 20 has outer surfaces 21, 22. However, case 10 may have outer surfaces 11, 22 and case 20 may have outer surface 21.

In the first exemplary embodiment, a notebook personal computer (laptop PC) has been described as an example of electronic device 1. However, electronic device 1 is not limited to the notebook personal computer.

Although the present invention has been fully described in connection with preferred exemplary embodiments with reference to the accompanying drawings, various modifications and corrections are obvious to those skilled in the art. It should be understood that, as long as such modifications and corrections do not deviate from the scope of the present invention according to the appended claims, such modifications and corrections are included therein.

The present disclosure is useful for, for example, an electronic device (for example, a laptop PC or the like) because it is possible to suppress a decrease in sound pressure of sound emitted by the speaker unit.

What is claimed is:

1. An electronic device comprising:
  a first housing that includes a first outer surface including a keyboard and includes a second outer surface opposite to the first outer surface;
  a second housing that houses a display and is connected to the first housing; and
  a speaker unit disposed inside the first housing,
  wherein
  the second outer surface includes a recess,
  the recess includes a through hole in at least a part of a surface of the recess, and at least a part of the speaker unit faces at least a part of a back surface of the surface of the recess including the through hole, wherein the first housing includes a third outer surface located between a peripheral edge of the first outer surface and a peripheral edge of the second outer surface, and the recess is open to the third outer surface, the recess includes a bottom surface continuous with the third outer surface, and the bottom surface is inclined toward the third outer surface in a direction approaching the first outer surface.

2. The electronic device according to claim 1, wherein the bottom surface has an inclination angle of 1° or more and 45° or less with respect to the second outer surface.

3. The electronic device according to claim 1, wherein the recess includes a pair of side surfaces facing each other and each continuous with the third outer surface, and at least one of the pair of side surfaces is inclined in a direction where a distance between the pair of side surfaces increases toward the third outer surface.

4. The electronic device according to claim 3, wherein an inclination angle of each of the pair of side surfaces inclined in a direction where a distance between the pair of side surfaces increases toward the third outer surface is 5° or more and 45° or less with respect to a virtual plane orthogonal to the second outer surface and the third outer surface.

5. The electronic device according to claim 1, wherein the recess includes a pair of side surfaces facing each other and each continuous with the second outer surface, and at least one of the pair of side surfaces is inclined in a direction where a distance between the pair of side surfaces increases toward the second outer surface.

6. The electronic device according to claim 5, wherein an inclination angle of each of the pair of side surfaces inclined in a direction where a distance between the pair of side surfaces increases toward the second outer surface is 5° or more and 45° or less with respect to a virtual plane orthogonal to the second outer surface and the third outer surface.

7. The electronic device according to claim 1, wherein the recess includes a pair of side surfaces facing each other and each continuous with the second outer surface and the third outer surface, and the pair of side surfaces is inclined in a direction where a distance between the pair of side surfaces increases toward the second outer surface and is inclined in a direction where a distance between the pair of side surfaces increases toward the third outer surface.

8. The electronic device according to claim 7, wherein an inclination angle of each of the pair of side surfaces inclined in a direction where a distance between the pair of side surfaces increases toward the third outer surface is 5° or more and 45° or less with respect to a virtual plane orthogonal to the second outer surface and the third outer surface.

9. The electronic device according to claim 7, wherein an inclination angle of each of the pair of side surfaces inclined in a direction where a distance between the pair of side surfaces increases toward the second outer surface is 5° or more and 45° or less with respect to a virtual plane orthogonal to the second outer surface and the third outer surface.

10. The electronic device according to claim 1, wherein the third outer surface includes:

a right outer side surface located outside one end in a longitudinal direction of the keyboard; and a left outer side surface located outside an other end in the longitudinal direction of the keyboard, the left outer side surface being opposite to the right outer side surface, the recess includes:

a first recess opened to the right outer side surface; and a second recess opened to the left outer side surface, and the speaker unit includes:

a first speaker unit facing at least a part of a back surface of a surface of the first recess including the through hole; and a second speaker unit facing at least a part of a back surface of a surface of the second recess including the through hole.

11. The electronic device according to claim 1, further comprising a speaker box that is disposed inside the first housing and includes the speaker unit.

* * * * *